United States Patent
Jones et al.

(10) Patent No.: US 6,240,540 B1
(45) Date of Patent: May 29, 2001

(54) CYCLIC REDUNDANCY CHECK IN A COMPUTER SYSTEM

(75) Inventors: Andrew Michael Jones, Bristol; Mark Owen Homewood, Somerset, both of (GB)

(73) Assignee: STMicroelectronics Limited, Bristol (GB)

( * ) Notice: Subject to any disclaimer, the term of this patent is extended or adjusted under 35 U.S.C. 154(b) by 0 days.

(21) Appl. No.: 09/249,400

(22) Filed: Feb. 12, 1999

(30) Foreign Application Priority Data

Feb. 13, 1998 (GB) ................................................. 9803117

(51) Int. Cl.[7] ..................................................... G06F 11/10
(52) U.S. Cl. ............................................................ 714/807
(58) Field of Search ............................................... 714/807

(56) References Cited

U.S. PATENT DOCUMENTS

| | | | |
|---|---|---|---|
| 4,467,444 | 8/1984 | Harmon, Jr. et al. | 364/900 |
| 4,723,243 | * 2/1988 | Joshi et al. | 371/37 |
| 5,539,756 | * 7/1996 | Glaise et al. | 371/37.1 |
| 5,844,923 | * 12/1998 | Condon | 371/47.1 |
| 5,931,967 | * 8/1999 | Shimizu et al. | 714/799 |
| 5,935,268 | * 8/1999 | Weaver | 714/758 |
| 5,953,240 | * 9/1999 | Prabhu et al. | 364/737 |

FOREIGN PATENT DOCUMENTS 0 608 848 A2   1/1994   (EP) .

OTHER PUBLICATIONS

Linde, "A Fast Algorithm for Calculating Cyclic Redundancy Checks", Correlations, Fall 1979, pp. 20–23, Dec. 1979.*
Perez et al., "Byte–wise CRC Calculations", IEEE Micro, Jun. 1983, pp. 41–50.*
Sarwate, "Computation of Cyclic Redundancy Checks via Table Look–Up", Communications of the ACM, Aug. 1988, vol. 31, No. 8, pp. 1008–1013.*
Crenshaw, "Implementing CRCs", Embedded Systems Programming, Jan. 1992, pp. 18–43.*

* cited by examiner

*Primary Examiner*—Stephen M. Baker
(74) *Attorney, Agent, or Firm*—Theodore E. Galanthay; Allen, Dyer, Doppelt, Milbrath & Gilchrist, P.A.

(57) ABSTRACT

A cyclic redundancy check value is computed by iterating a loop in which the contents of an operand having a first CRC value and a data value are shifted 1 bit to the end at which the CRC value is located. A generator value is exclusive-RED into corresponding respective bits of the operand only if the bit shifted out of the operand by the shift was set. This is repeated until a data byte has been displaced entirely and a modified cyclic redundancy check value occupies the most significant bytes, but now incorporates the original data byte in modified form.

25 Claims, 4 Drawing Sheets

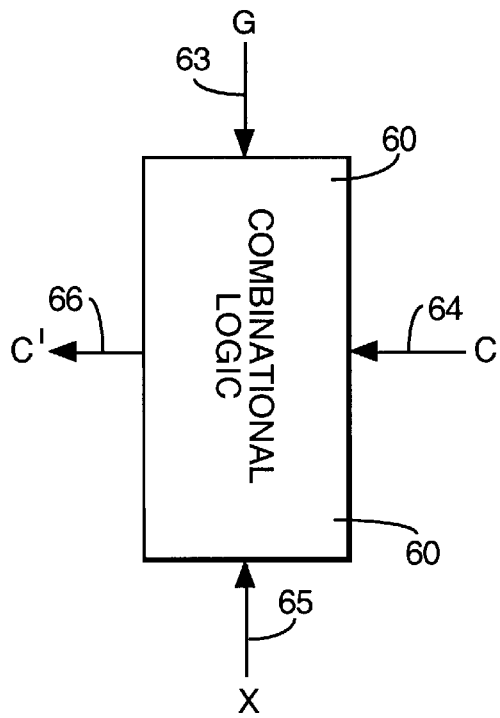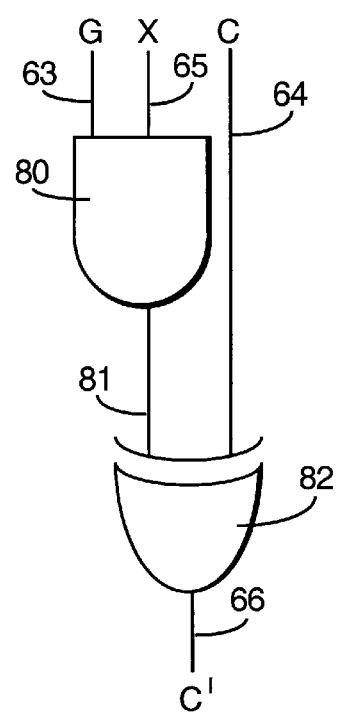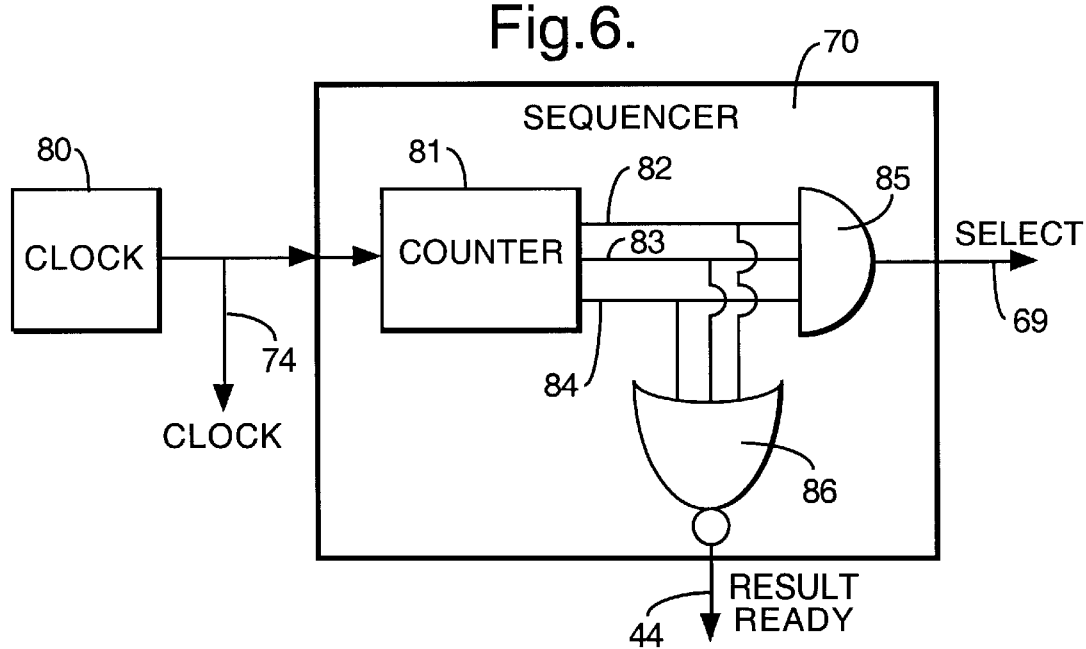

CYCLIC REDUNDANCY CHECK IN A COMPUTER SYSTEM

FIELD OF THE INVENTION

The invention relates to computer instructions, and, more particularly to a computer system using instructions for effecting a cyclic redundancy check.

BACKGROUND OF THE INVENTION

It is known to carry out cyclic redundancy checks on data in many communication protocols and data storage formats. They increase the reliability of data transmission and storage by defining a check sum which may be appended to data when it is written or sent. A receiver or reader of the data can recompute the check sum to confirm the integrity of the data.

It is an object of the present invention to provide an improved method and improved apparatus for carrying out a cyclic redundancy check in a computer system.

SUMMARY OF THE INVENTION

The invention is particularly, but not exclusively, applicable for use in data transmission and storage in accordance with MPEG protocol used for video signals. It is also particularly useful in digital audio signal compression techniques.

The present invention provides a method of executing a computer instruction to generate a cyclic redundancy check on data in a computer system, which instruction operates (a) to locate a digital word comprising, in a sequence of bit locations at one end of the word, a first cyclic redundancy check value and a data value adjacent the check value, the data value comprising a plurality of bit groups each having the same bit length, (b) to locate a generator value of the same bit length as the check value, (c) shifting all bits of the digital word a predetermined number of bit locations towards the one end of the word, (d) selectively forming an exclusive OR combination of bits of the generator value with respective corresponding bits in the sequence of bit locations, the selective formation providing a result dependent on detecting a particular value for any bit displaced from the sequence of bit locations on shifting the bits of the digital word towards the one end of the word, and using the results to replace digital values in the corresponding bit locations of the sequence of bit locations, (e) repeating the shifting of step (c) and selective formation of an exclusive OR combination of step (d) for each bit in one the group of bits of the data value, and (f) holding a resultant digital word comprising a revised cyclic redundancy check value together with any bit group representing a data value not yet shifted into the sequence of bit locations.

In one embodiment the predetermined number of bit locations in the shifting step (c) is one.

In one embodiment a single bit is displaced out of the sequence of bit locations on shifting the bit of the digital word towards the one end of the word, and no result is provided for each exclusive OR combination of step (d) if the last the single bit displaced has a predetermined one of two alternative values.

Conveniently the data value comprises a plurality of bytes, each the bit group comprising one byte.

Preferably the sequence of bit locations has a bit length equal to the bit length of the data value.

Preferably the generator value has a bit length equal to the bit length of the sequence of bit locations.

In one embodiment the one end of the digital word is the end of most significance.

The invention may include repeatedly executing a cyclic redundancy check instruction as mentioned above whereby a cyclic redundancy check value is generated for each data bit group sequentially, successive executions of the cyclic redundancy check instruction being effected without relocation of the bit groups of the data value in the digital word following each execution of the cyclic redundancy check instruction.

The invention also provides a computer system comprising an instruction store and execution circuitry responsive to instructions in the store including a cyclic redundancy check instruction, the execution circuitry including (a) first bit location circuitry to locate a digital word comprising in a sequence of bit locations at one end of the word a first cyclic redundancy check value and a data value adjacent the check value, the data value comprising a plurality of bit locations each having the same bit length, (b) second bit location circuitry to locate a generator value of the same bit length as the check value, (c) bit shifting circuitry for shifting all bits of the digital word a predetermined number of bit locations towards the one end of the word, (d) exclusive OR circuitry for selectively forming an exclusive OR combination of bits of the generator value with respective corresponding bits in the sequence of bit locations, the selective formation providing a result dependent on detecting a particular value for any bit displaced from the said sequence of bit locations on shifting the bits of the digital word towards the one end of the word, and using the results to replace the digital values in the corresponding bit locations of the sequence of bit locations, (e) sequence circuitry for repeating for each bit in one the group of bits of the data value the shifting step of bits in the digital word and the selective formation of exclusive OR combinations, and (f) result holding circuitry for holding a resultant digital word comprising a revised cyclic redundancy check value together with any bit group representing a data value not yet shifted into the sequence of bit locations.

In one embodiment the bit shifting circuitry is arranged to shift all bits of the digital word by a one bit displacement for each shifting operation.

Preferably in which enabling circuitry is connected to the exclusive OR circuitry the enabling circuitry being connected to the first bit location circuitry and arranged to control the exclusive OR circuitry in dependence on the particular value of bits displaced from the sequence of bit locations on shifting the bits of the digital word towards the one end.

Preferably the first bit location circuitry provides a plurality of bytes for the data value of the digital word.

Preferably the first bit location circuitry provides the same number of byte locations for the first cyclic redundancy check value as the number of byte locations for the data value.

Preferably the second bit location circuitry provides the same bit length for the generator value as the first bit location circuitry provides for the first cyclic redundancy check value.

The invention includes a computer system comprising processor circuitry memory and instruction holding circuitry the instruction holding circuitry holding a cyclic redundancy check instruction operable to carry out the method aforesaid.

BRIEF DESCRIPTION OF THE DRAWINGS

FIG. 6 shows more detail of part of the apparatus of FIG. 4.

DETAILED DESCRIPTION OF THE PREFERRED EMBODIMENTS

Figure 1:
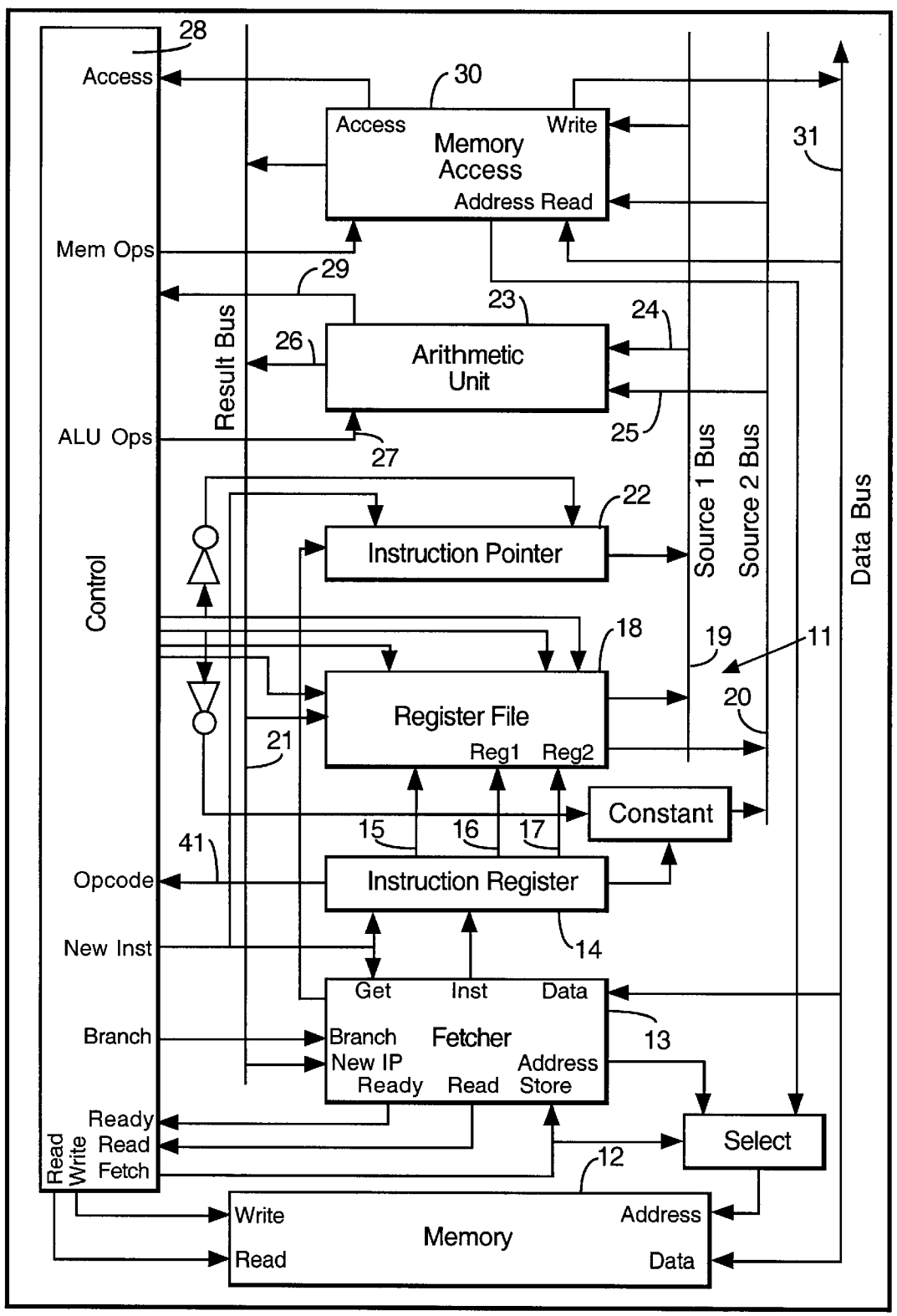
FIG. 1 is a block diagram of a computer system for use in accordance with the invention.

The computer system of FIG. 1 includes processor circuitry 11 and a memory 12. The memory 12 may store instructions as well as data for use by the processor circuitry 11. An instruction retrieve circuit 13 may obtain instructions from the memory 12 for loading into an instruction register 14. Lines 15, 16 and 17 provide an indication from the instruction register 14 to identify source and destination registers in a register file 18. The register file is connected to a first source bus 19 and to a second source bus 20. The register file 18 is also connected to a result bus 21. The instruction retrieve circuit 13 is coupled to an instruction pointer register 22 to identify the next address in memory 12 from which an instruction is to be obtained. An arithmetic unit 23 is coupled by lines 24 and 25 to the source buses 19 and 20 respectively. It is also connected by line 26 to the result bus 21. The operation of the arithmetic unit 23 is controlled by an operation select input 27 from a control unit 28. The state of the arithmetic unit 23 is also output on line 29 to the control unit 28. A memory access unit 30 is also coupled to the source buses 19 and 20, the result bus 21 and a data bus 31 connected to the memory 12.

Figure 3:
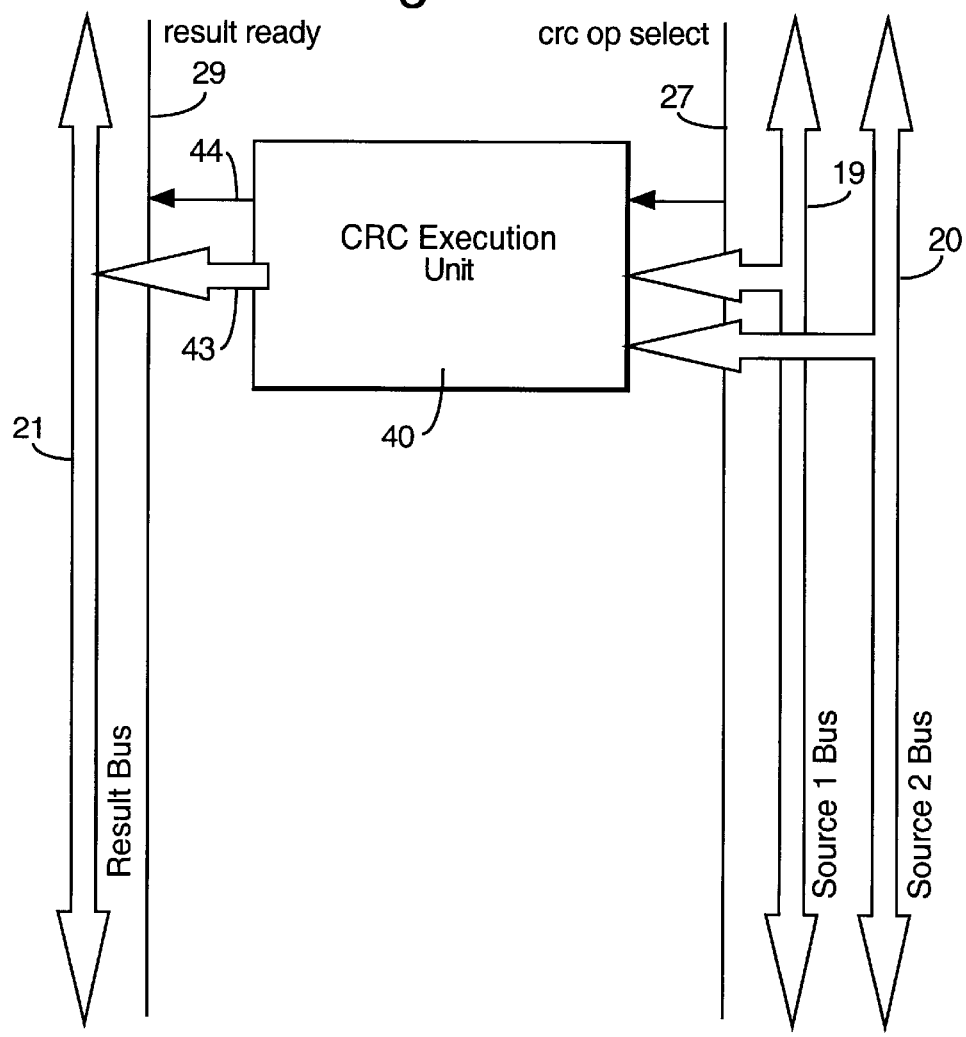
FIG. 3 shows further details of part of the apparatus of FIG. 1.

To carry out the cyclic redundancy check of the present invention, the arithmetic unit 23 incorporates a CRC execution unit 40 as shown in FIG. 3. This is connected to the operation select line 27 to control operation of the execution unit 40. The requirement to carry out a cyclic redundancy check is determined by decoding of an instruction in the instruction register 14 to provide an opcode signal on line 41 to the control unit 28 and thereby provide the appropriate operation select signal on line 27 to unit 40 within the arithmetic unit 23. The execution unit 40 receives first and second operands from the first source bus 19 and the second source bus 20. When the cyclic redundancy check has been carried out by the execution unit 40 the result is output on bus 43 to the result bus 21. This can be held in the register file 18 in a destination register determined by the signal on line 15 from the instruction register 14. The execution unit 40 also provides a result ready output on line 44 which is connected to line 29 connected to the control unit 28.

In accordance with the invention, the memory 12 includes a cyclic redundancy check instruction and one form of that instruction is as follows:

big endian crc on a 1-byte datum
result,source1,source2          unsigned(x)unsigned(x)unsigned(4) .p 5:OP=0001 Fc=0100110000     result=Ra, source1=Rb, source2=Rc acc<- source1
gen ← source2[1]<<32
i=0 FOR 8

-continued acc ←acc<<1
IF($acc_{<64FOR\ 1>} \neq 0$)
    acc ←accXgenX(1<<64)
result←ZeroExtend63(acc)

This example of the instruction is in big endian form which means that bytes of data are processed in order of increasing address in the memory. The instruction may be provided in little endian form in which bytes are processed in order of decreasing address in memory.

Figure 2:
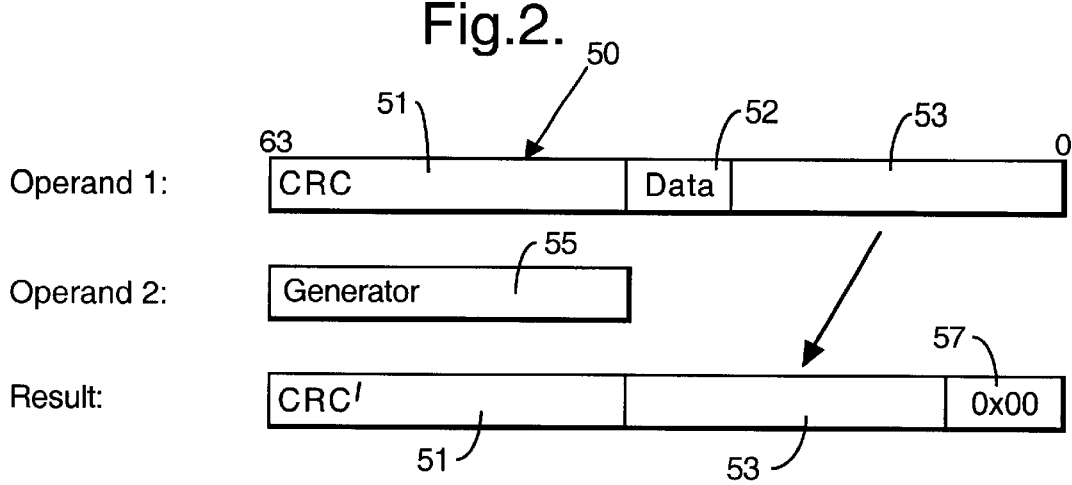
FIG. 2 shows schematically the use of operands to produce a cyclic redundancy check in the apparatus of FIG. 1.

The operation of the particular instruction set out above will now be described with reference to FIG. 2. First, a 64 bit word is taken from the first source bus 19 and loaded into a register 50 within the execution unit 40 thereby forming a first operand. This operand includes a first cyclic redundancy check value 51 formed as a 32 bit string at the most significant end of the digital word. The word also includes 4 bytes of data each 8 bits long, at the least significant end of the digital word. In FIG. 2 the data byte next to the cyclic redundancy check value is marked 52 and the other 3 bytes of data are marked 53. It will be seen that the cyclic redundancy check value 51 therefore has the same bit length (32 bits) as the data portion 52 and 53. The execution unit 40 also has a register 55 into which is loaded from the second source bus 20 a 32 bit generator value forming a second operand. Both the generator value and the first cyclic redundancy check value will be specified by the protocol of the data transmission being used by the computer system.

In accordance with the definition of the instruction, once the first and second operands have been loaded as shown in FIG. 2, the cyclic redundancy check value CRC is computed by iterating a loop for each of the 8 bits of the data byte 52. On each iteration, the contents of operand 1 in FIG. 2 are shifted 1 bit to the left and the generator value is exclusive-ORed into corresponding respective bits of operand 1 if the bit shifted out of operand 1 by the left shift was set. In other words, the last value displaced from the most significant end of operand 1 had the value 1. If the displaced bit had the value 0 then no exclusive OR value is enabled. This is repeated eight times so that the data byte 52 has now been displaced entirely to the left as shown in the result section of FIG. 2 and the modified cyclic redundancy check value still occupies the most significant 4 bytes marked 51 but now incorporates the original data byte 52 in modified form. The least significant byte 57 is now empty. The result is then output on bus 43 to the result bus 21 with line 44 providing a result ready signal to line 29.

The above described operation will have calculated the modified cyclic redundancy check value for the first byte of data 52 in operand 1. A particular advantage of this embodiment of the invention is that the same instruction may be repeatedly executed to carry out further computation of the cyclic redundancy check value for each of the data bytes in operand 1 of FIG. 2. It will be appreciated that the operation of carrying out the cyclic redundancy check computation for the first data byte 52 has the effect of bringing the second, third and fourth bytes towards the sequence of bit locations 51 which hold the cyclic redundancy check value. Consequently a second execution of the same instruction will repeat the cycle thereby carrying out the cyclic redundancy check computation for the second byte of data in the digital word. The same instruction may be executed a third and a fourth time so as to complete the cyclic redundancy check calculation for each of the four data bytes in the word. It is not necessary to carry out any additional instructions intermediate repeated executions of the cyclic redundancy check instruction so as to relocate any of the data bytes prior to calculating the appropriate cyclic redundancy check value. Each successive data byte takes up an appropriate location for calculation of the new cyclic redundancy check value by computation of the value for the preceding data byte.

The use of this instruction thereby increases the efficiency with which cyclic redundancy check values can be computed. It requires a lower instruction count giving faster code and higher code density in effecting the computation for a plurality of data bytes. It increases the efficiency with which the retrieval of data can be performed simultaneously with the processing of data retrieved previously. The computation by consecutive CRC instructions increases the efficiency of code which may simultaneously perform an endian conversion on the next iteration of data.

The structure and operation of the execution unit 40 will now be described in more detail with reference to FIGS. 4, 5A, 5B and 6.

Figure 4:
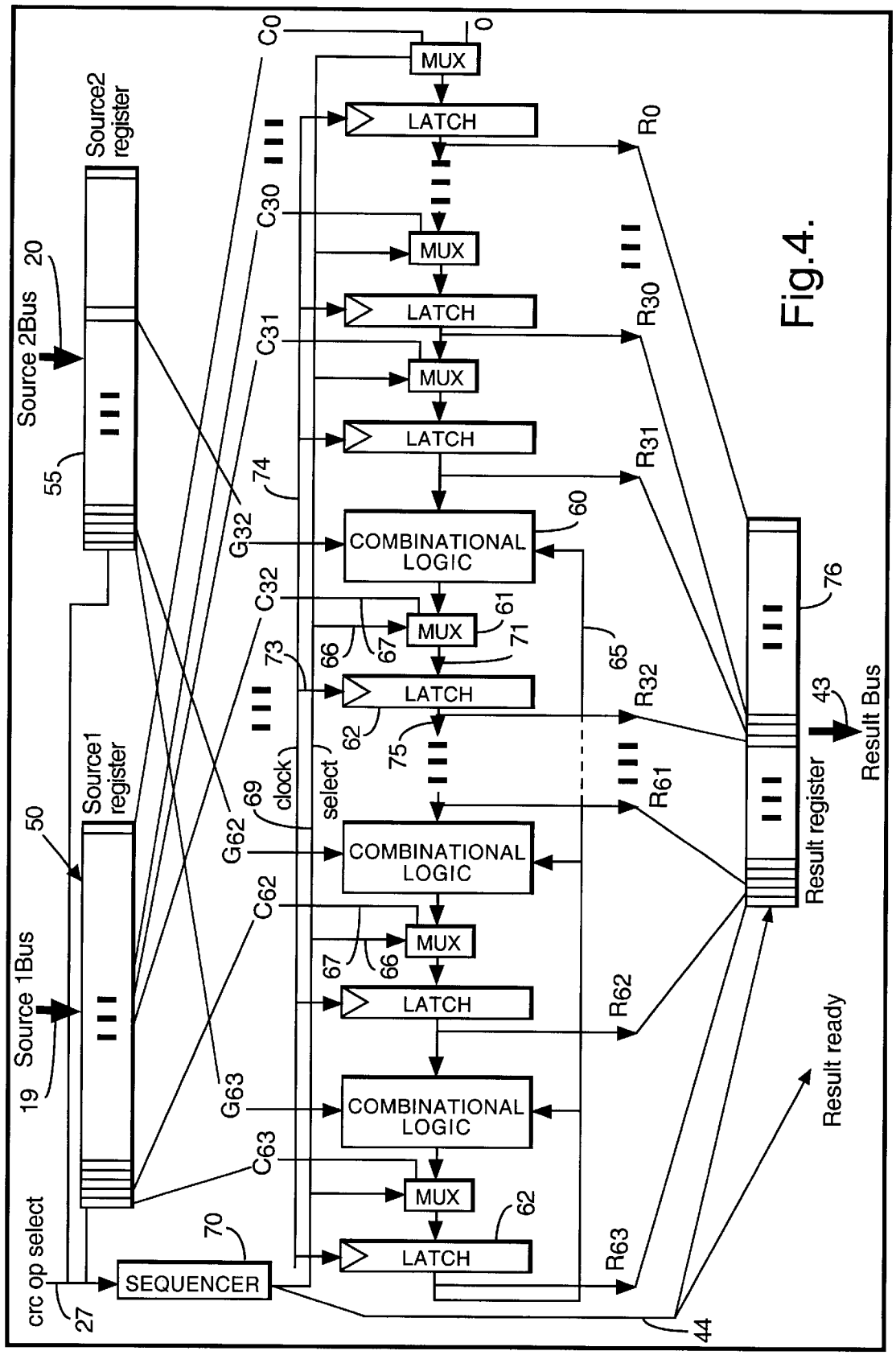
FIG. 4 shows in more detail part of the apparatus of FIG. 3, FIGS. 5A and 5B show further detail of part of the apparatus of FIG. 4.

In FIG. 4 similar reference numerals have been used for parts similar to those already described with reference to FIGS. 2 and 3. The first operand is held in register 50 and the generator or second operand is held in the most significant 32 locations of a second register 55 while the least significant positions are not used. A sequence of combinational logic units 60 are provided, one for each of the 32 bits of the generator value in register 55. Each of the 32 combinational units 60 has an output connected to a multiplexer 61 which in turn has an output connected to a clocked latch 62. Each set of units 60, 61 and 62 is similar in construction and consequently only one will be described in detail.

FIG. 5A shows one combinational logic unit 60 having a first input G marked 63 which receives one bit value from the generator in register 55. It receives a second input C marked 64 which is derived from a corresponding bit location of the cyclic redundancy check value in register 50. By corresponding bit values is meant bit values from locations of the same significance. Unit 60 also receives an input X marked 65 which is common to all logic units 60 and is derived from the latch 62 in the position of most significance. In other words, the latch 62 outputs the bit value which is displaced from the first operand on each left shift of the value in register 50.

Each combinational logic unit 60 provides a modified C' output 66 which forms an input to the connected multiplexer 61. Each multiplexer 61 has a further input 67 which provides a cyclic redundancy check value C from the corresponding bit location of register 50 as the generator value which is input from register 55. The multiplexer 61 has a further input 68 which is connected to a select line 69 output from a sequencer 70. Each multiplexer provides an output 71 connected to the clock latch 62. The latch 62 is clocked in its operation by an input 73 taken from a clock line 74. The latch output 75 is supplied both to a result register 76 and to the input 64 of the adjacent combinational logic unit 60 of greatest significance.

While FIG. 5A shows more clearly the input and output of the combinational logic unit 60, the construction is shown more fully in FIG. 5B. The unit includes an AND gate 80 having the two inputs 63 and 65. The output 81 of the AND gate 80 forms one input to an exclusive OR gate 82 with the other input being formed by line 64. The output of the exclusive OR gate 82 is provided on line 66. It will therefore be seen that the function of the two gates described in FIG. 5B is to permit an exclusive OR combination of a value G on line 63 from register 50 with a generator value C from a corresponding bit location of register 55 only if signal X on line 65 from the most significant latch 62 indicates that the last value displaced from register 51 was set to the predetermined value, in this case 1. Provided the value X is 1, the AND gate 80 allows signal on line 63 to form a second input to the gate 82 together with the signal on line 64 thereby providing the exclusive OR output 66.

In operation, the operation select line 27 is asserted on decoding the cyclic redundancy check instruction and registers 50 and 55 latch the values from the corresponding buses 19 and 20. The sequencer 70 asserts a signal on line 69 to the multiplexer 61 which cause data from register 50 to be latched into the multiplexer corresponding to the respective bit positions. It will be appreciated that for the 32 bit locations of least significance, respective multiplexers 61 and latches 62 are provided without combinational logic units 60.

This is shown in the right hand half of FIG. 4 where the values from register 50 become available through the multiplexers and latches for ultimate supply to the combinational logic units 60 corresponding to bit location 32. Under operation of the clock signals on line 74, each latch 62 provides a cyclic redundancy check value to the combinational logic unit 60 of greater significance, thereby causing a sequential leftwards shift. The unit 60 combines this value C with the generator value which is input from the corresponding bit location and a result is obtained dependent on whether or not the output X of the most significant latch 62 is set to the value 1.

The output of the logic unit 60 on line 66 is then available as an input to the associated multiplexer 61 and under operation of the sequencer 70 the multiplexer 61 forward the output value 66 to the connected latch 62. This step is repeated a further seven times on successive clock cycles. At the end of the eight operations, the sequencer 70 asserts the result ready output line 44 so that the values then held in all 64 latches 62 are read into the corresponding bit positions of the result register 76. This is then supplied to the result bus 43 connected to bus 21.

The construction of the sequencer 70 is described in more detail in FIG. 6. In this case a clock 80 provides a clock signal on line 74 and to a counter 81 in the sequencer 70. The counter 81 is arranged to count down from 7 to 0. The binary output of the counter is provided on three lines 82, 83 and 84. These are connected to an AND gate 85 to provide a select output on line 69. Lines 82, 83 and 84 are connected to a NOR gate 86 to provide the result ready signal on line 44 when the count has reached zero.

It will therefore be seen that the circuit of FIGS. 4, 5 and 6 carries out the sequence of operations defined in the above definition of the cyclic redundancy check instruction as explained with reference to FIG. 2.

The invention is not limited to the details of the foregoing example. In the above example the left shift of bits for each operation is a one bit displacement. The circuitry may be designed to handle a plurality of bit shifts (for example 2 or more) during each cycle of operation.

What is claimed is:

1. A method of executing a computer instruction to generate a cyclic redundancy check on data in a computer system, the method comprising the steps of:

(a) locating a digital word comprising in a sequence of bit locations at one end of the word a first cyclic redundancy check value and a data value adjacent the check value, said data value comprising a plurality of bit groups each having the same bit length;

(b) locating a generator value of the same bit length as said check value;

(c) shifting all bits of the digital word a predetermined number of bit locations towards said one end of the word;

(d) selectively forming an exclusive OR combination of bits of the generator value with respective corresponding bits in said sequence of bit locations, the selective formation providing a result dependent on detecting a particular value for any bit displaced from said sequence of bit locations on shifting the bits of the digital word towards said one end of the word, and using the results to replace digital values in the corresponding bit locations of said sequence of bit locations;

(e) repeating said shifting of step (c) and selective formation of an exclusive OR combination of step (d) for each bit in one said group of bits of said data value; and (f) holding a resultant digital word comprising a revised cyclic redundancy check value together with any bit group representing a data value not yet shifted into said sequence of bit locations.

2. A method according to claim 1, wherein the predetermined number of bit locations in the shifting step (c) is one.

3. A method according to claim 2, wherein a single bit is displaced out of said sequence of bit locations on shifting the bit of the digital word towards said one end of the word, and no result is provided for each exclusive OR combination of step (d) if the last said single bit displaced has a predetermined one of two alternative values.

4. A method according to claim 1, wherein said data value comprises a plurality of bytes, each said bit group comprising one byte.

5. A method according to claim 1, wherein said sequence of bit locations has a bit length equal to the bit length of said data value.

6. A method according to claim 1, wherein said generator value has a bit length equal to the bit length of said sequence of bit locations.

7. A method according to claim 1, wherein said one end of the digital word is the end of most significance.

8. A method of executing computer instructions comprising the steps of:

executing a cyclic redundancy check by (a) locating a digital word comprising in a sequence of bit locations at one end of the word a first cyclic redundancy check value and a data value adjacent the check value, said data value comprising a plurality of bit groups each having the same bit length, (b) locating a generator value of the same bit length as said check value, (c) shifting all bits of the digital word a predetermined number of bit locations towards said one end of the word, (d) selectively forming an exclusive OR combination of bits of the generator value with respective corresponding bits in said sequence of bit locations, the selective formation providing a result dependent on detecting a particular value for any bit displaced from said sequence of bit locations on shifting the bits of the digital word towards said one end of the word, and using the results to replace digital values in the corresponding bit locations of said sequence of bit locations, (e) repeating said shifting of step (c) and selective formation of an exclusive OR combination of step (d) for each bit in one said group of bits of said data value, and (f) holding a resultant digital word comprising a revised cyclic redundancy check value together with any bit group representing a data value not yet shifted into said sequence of bit locations; and repeatedly executing the cyclic redundancy check so that a cyclic redundancy check value is generated for each data bit group sequentially, and so that successive executions of the cyclic redundancy check instruction are effected without relocation of the bit groups of the data value in the digital word following each execution of the cyclic redundancy check instruction.

9. A method according to claim 8, wherein the predetermined number of bit locations in the shifting step (c) is one.

10. A method according to claim 9, wherein a single bit is displaced out of said sequence of bit locations on shifting the bit of the digital word towards said one end of the word, and no result is provided for each exclusive OR combination of step (d) if the last said single bit displaced has a predetermined one of two alternative values.

11. A method according to claim 8, wherein said data value comprises a plurality of bytes, each said bit group comprising one byte.

12. A method according to claim 8, wherein said sequence of bit locations has a bit length equal to the bit length of said data value.

13. A method according to claim 8, wherein said generator value has a bit length equal to the bit length of said sequence of bit locations.

14. A method according to claim 8, wherein said one end of the digital word is the end of most significance.

15. A computer system comprising:

an instruction store and execution circuitry responsive to instructions in said instruction store including a cyclic redundancy check instruction, said execution circuitry comprising (a) first bit location circuitry to locate a digital word comprising in a sequence of bit locations at one end of the word a first cyclic redundancy check value and a data value adjacent the check value, said data value comprising a plurality of bit locations each having the same bit length, (b) second bit location circuitry to locate a generator value of the same bit length as said check value, (c) bit shifting circuitry for shifting all bits of the digital word a predetermined number of bit locations towards said one end of the word, (d) exclusive OR circuitry for selectively forming an exclusive OR combination of bits of the generator value with respective corresponding bits in said sequence of bit locations, the selective formation providing a result dependent on detecting a particular value for any bit displaced from the said sequence of bit locations on shifting the bits of the digital word towards said one end of the word, and using the results to replace the digital values in the corresponding bit locations of said sequence of bit locations, (e) sequence circuitry for repeating for each bit in one said group of bits of said data value the shifting step of bits in the digital word and the selective formation of exclusive OR combinations, and (f) result holding circuitry for holding a resultant digital word comprising a revised cyclic redundancy check value together with any bit group representing a data value not yet shifted into said sequence of bit locations.

16. A computer system according to claim 15, wherein the bit shifting circuitry is arranged to shift all bits of the digital word by a one bit displacement for each shifting operation.

17. A computer system according to claim 15, further comprising enabling circuitry connected to said exclusive OR circuitry; and wherein said enabling circuitry is connected to the first bit location circuitry and arranged to control the exclusive OR circuitry in dependence on a particular value of bits displaced from said sequence of bit locations on shifting the bits of the digital word towards said one end.

18. A computer system according to claim 15, wherein said first bit location circuitry provides a plurality of bytes for the data value of the digital word.

19. A computer system according to claim 18, wherein said first bit location circuitry provides a same number of byte locations for the first cyclic redundancy check value as the number of byte locations for the data value.

20. A computer system according to claim 18, wherein the second bit location circuitry provides a same bit length for the generator value as the first bit location circuitry provides for the first cyclic redundancy check value.

21. A computer system comprising:
  an instruction store and execution circuitry responsive to instructions in said instruction store including a cyclic redundancy check instruction, said execution circuitry comprising
    (a) first bit location circuitry to locate a digital word comprising in a sequence of bit locations at one end of the word a first cyclic redundancy check value and a data value adjacent the check value, said data value comprising a plurality of bit locations each having the same bit length,
    (b) second bit location circuitry to locate a generator value of the same bit length as said check value,
    (c) bit shifting circuitry for shifting all bits of the digital word by a one bit displacement for each shifting operation towards said one end of the word,
    (d) exclusive OR circuitry for selectively forming an exclusive OR combination of bits of the generator value with respective corresponding bits in said sequence of bit locations, the selective formation providing a result dependent on detecting a particular value for any bit displaced from the said sequence of bit locations on shifting the bits of the digital word towards said one end of the word, and using the results to replace the digital values in the corresponding bit locations of said sequence of bit locations,
    (e) sequence circuitry for repeating for each bit in one said group of bits of said data value the shifting step of bits in the digital word and the selective formation of exclusive OR combinations, and
    (f) result holding circuitry for holding a resultant digital word comprising a revised cyclic redundancy check value together with any bit group representing a data value not yet shifted into said sequence of bit locations.

22. A computer system according to claim 21, further comprising enabling circuitry connected to said exclusive OR circuitry; and wherein said enabling circuitry is connected to the first bit location circuitry and arranged to control the exclusive OR circuitry in dependence on a particular value of bits displaced from said sequence of bit locations on shifting the bits of the digital word towards said one end.

23. A computer system according to claim 21, wherein said first bit location circuitry provides a plurality of bytes for the data value of the digital word.

24. A computer system according to claim 23, wherein said first bit location circuitry provides a same number of byte locations for the first cyclic redundancy check value as the number of byte locations for the data value.

25. A computer system according to claim 23, wherein the second bit location circuitry provides a same bit length for the generator value as the first bit location circuitry provides for the first cyclic redundancy check value.

\* \* \* \* \*